(12) United States Patent
Janik

(10) Patent No.: US 8,368,246 B2
(45) Date of Patent: *Feb. 5, 2013

(54) METHOD AND APPARATUS FOR RESISTIVE POWER DISTRIBUTION

(76) Inventor: John Bradford Janik, Humble, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,820

(22) Filed: Aug. 5, 2010

(65) Prior Publication Data

US 2011/0187201 A1    Aug. 4, 2011

(51) Int. Cl.
*H02J 3/14* (2006.01)
*H05K 1/11* (2006.01)
*H05K 1/03* (2006.01)

(52) U.S. Cl. .................. 307/31; 174/262; 174/256
(58) Field of Classification Search .............. 307/11, 307/31; 174/96, 256, 261, 262, 98, 99 B
See application file for complete search history.

(56) References Cited

U.S. PATENT DOCUMENTS

| 3,683,309 | A | * | 8/1972 | Hirose | 338/214 |
| 3,761,624 | A | | 9/1973 | Lewis | |
| 3,934,091 | A | | 1/1976 | Stidham | |
| 4,104,600 | A | * | 8/1978 | Mayer | 333/181 |
| 5,576,940 | A | | 11/1996 | Steigerwald et al. | |
| 7,804,190 | B2 | * | 9/2010 | Janik | 307/31 |
| 2008/0192392 | A1 | * | 8/2008 | Folts et al. | 361/19 |

* cited by examiner

*Primary Examiner* — Micheal Rutland Wallis
(74) *Attorney, Agent, or Firm* — G Michael Roebuck

(57) ABSTRACT

An electrical power distribution method and apparatus are disclosed, the apparatus comprising a first power distribution member section receiving electrical power from a power supply and a second high resistivity power distribution member section, electrically connected to the first section for supplying the electrical power to an electrical device in electrical communication with the high resistivity section.

20 Claims, 6 Drawing Sheets

METHOD AND APPARATUS FOR RESISTIVE POWER DISTRIBUTION

CROSS REFERENCE TO RELATED APPLICATIONS

This patent application is a continuation of U.S. patent application Ser. No. 11/857,550 by John B. Janik, entitled Method And Apparatus For Resistive Power Distribution, which is incorporated herein by reference in its entirety.

FIELD OF THE DISCLOSURE

The present disclosure relates to the field of electrical power distribution.

BACKGROUND OF THE DISCLOSURE

Electric power is essential to a modern industrial plant or ship's functional effectiveness. Electric power steers the ship, operates the ship's rudder hydraulic system, sensitive navigation systems, dynamic positioning systems, runs auxiliary systems for cooking and cleaning and provides light and power to interior systems. An industrial plant or ship without electric power is useless for its operational mission or purpose. The primary power distribution voltage, phase, and frequency used on many U.S. and international vessels are three-phase 50 or 60 Hz at 450-600 Volts AC. Secondary voltage, phase, and frequency are 120-240 Volts, single or three-phase, 50 or 60 Hz. The secondary voltage is derived from the primary voltage system through transformer banks and circuit breakers. Lighting distribution systems are 120-240 V, single or three-phase, 50 or 60 Hz and are supplied from the primary power circuits to transformer banks.

DETAILED DESCRIPTION

Figure 1:
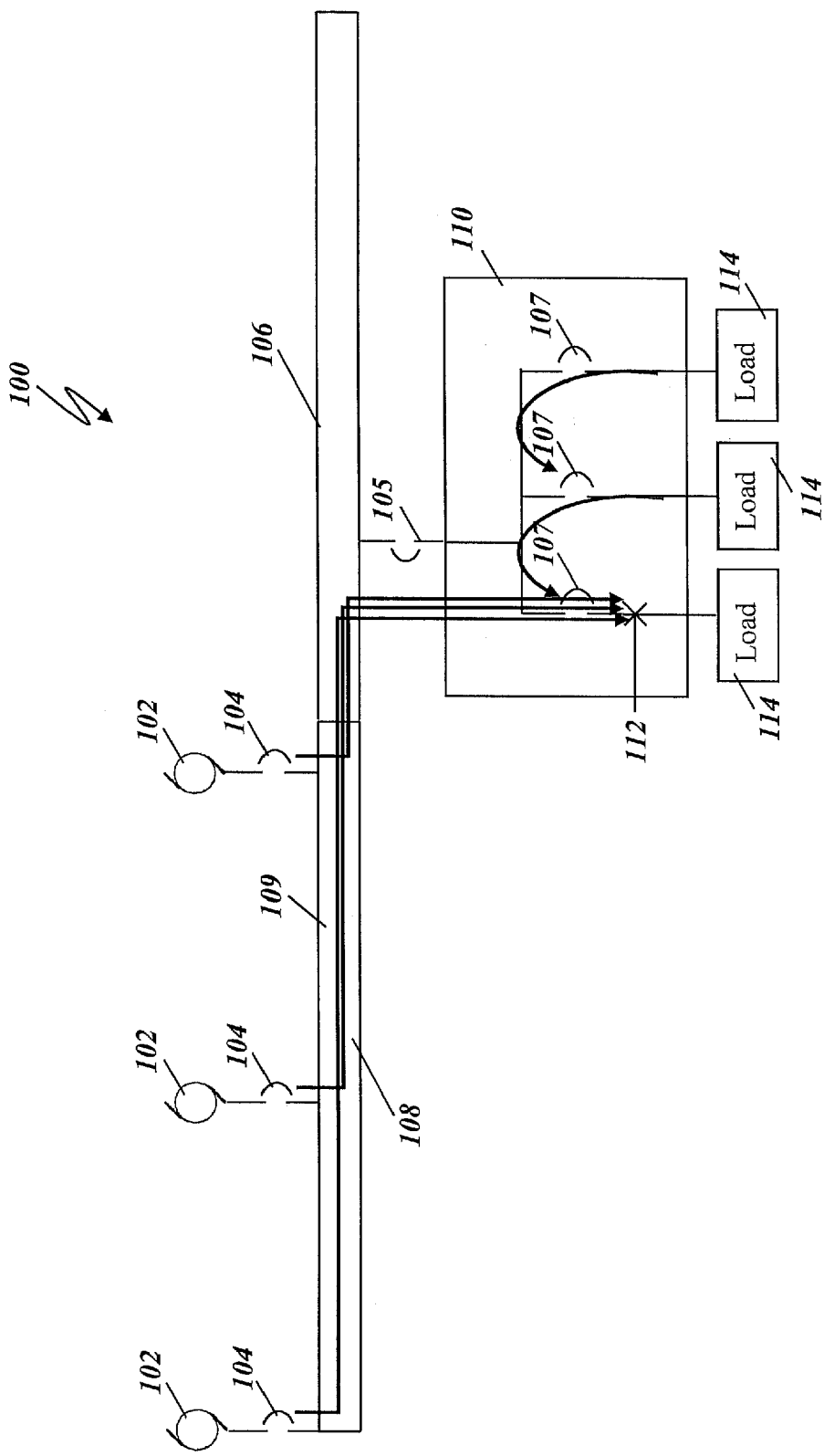
FIG. 1 depicts an illustrative embodiment of a power distribution system using a resistive member to supply power to an electrical device.

In another particular embodiment, an electrical power distribution apparatus is disclosed, the apparatus comprising a first power distribution member section for receiving electrical power from a power supply; and a second high resistivity power distribution member section having a resistivity higher than the first section and electrically connected to the first section for supplying the electrical power to an electrical device. In another particular embodiment of the apparatus, the apparatus further comprises an electrical device in electrical communication with the second section, wherein the second section reduces a current to the electrical device. In another particular embodiment of the apparatus the apparatus further comprises the electrical device is an electrical circuit breaker receiving power from the second section during an electrical short circuit on a load side of the electrical circuit breaker.

In another particular embodiment of the apparatus, the first section has a resistivity of approximately one half of the resistivity of the second section. In another particular embodiment of the apparatus, the first section is made of copper and the second section is made of steel. In another particular embodiment of the apparatus, the first section and the second section have resistivity approximately equal to twice the resistivity of copper. In another particular embodiment of the apparatus, at least one of the first section and the second section is a bus. In another particular embodiment of the apparatus, at least one of the first section and the second section is a cable. In another particular embodiment of the apparatus, the second section forms an electrical filter with a capacitance of the electrical device for smoothing electrical disturbances in the electrical power supplied to the electrical device.

In another particular embodiment of the apparatus, the electrical device is a device selected from the group consisting of an uninterruptable power supply and an alternating current drive for a variable speed alternating current motor. In another particular embodiment of the apparatus, the electrical disturbances are one selected from the group consisting of a voltage spike and a voltage notch. In another particular embodiment of the apparatus, the second section comprises a center section and the first section comprises a low resistivity outer member surrounding the center member, wherein the low resistivity member forms an inductor around the center member so that the low resistivity member presents a high reactance to high frequency voltages substantially higher than 60 Hz, so that the high frequency currents pass through the center member and experience a current reducing voltage loss. In another particular embodiment of the apparatus, low frequency electrical power of approximately 60 Hz sees a low reactance on the low resistivity outer member and travels through the inductor low resistivity outer member. In another particular embodiment of the apparatus, the apparatus further comprises the low resistivity outer member has a resistivity of substantially one half the resistivity of the high resistivity center member.

In another particular embodiment of the apparatus, the low resistivity outer member is made of copper and the high resistive center member is made of steel. In another particular embodiment of the apparatus, an outer high resistivity member surrounding the low resistivity member and the center member. In another particular embodiment of the apparatus, the apparatus further comprises a conductive connector at each end of the cable, wherein the conductive connectors form an electrical connection between the high resistivity center member, the outer low resistivity member and the outer high resistivity member, wherein low frequency current at substantially 60 Hz flows through the outer lower resistivity member and high frequency currents above 1 KHz flow though the high resistivity center member.

In another particular embodiment of the apparatus, the high resistivity center member and the high resistivity outer member form a magnetic flux path for magnetic flux generated by current flowing in the low frequency surrounding member. In another particular embodiment of the apparatus, the apparatus further comprises a first power distribution member section for receiving electrical power from a a second high resistivity power distribution member section having a resistivity higher than the first section and electrically connected an electrical device in electrical communication with the second section. In another particular embodiment of the apparatus, the second section comprises a center member and the first section comprises a low resistivity outer member surrounding the center member.

In another particular embodiment an electrical power distribution apparatus is disclosed, comprising an outer high resistivity member surrounding the low resistivity outer member and the center member. In another particular embodiment a method for distributing electrical power is disclosed, the method comprising receiving the electrical power on a low resistivity member; and supplying the electrical power to an electrical device through a high resistivity member. In another particular embodiment of the method, the high resistivity member has a resistivity that is substantially twice the resistivity of the low resistivity member. In another particular embodiment of the method, at least one of the high resistivity member and the low resistivity member is a bus. In another particular embodiment of the method, at least one of the high resistivity member and the low resistivity member is a cable.

Turning now to FIG. 1, in an illustrative embodiment a power distribution apparatus is provided having a low resistivity power distribution member section (low resistivity section) 108 and a high resistivity power distribution member section (high resistivity section) 106. The power distribution members can be an electrical power distribution bus or electrical power distribution cable. The power distribution members can also be a combination of a bus and a power cable, wherein either the high resistivity member section is a cable or a bus and the low resistivity member section is either a cable or a bus. In another embodiment, the power distribution member can be any type of electrical power distribution apparatus now known or unknown.

In another particular embodiment, the high resistivity section has substantially higher resistivity that is, around twice as much electrical resistivity than the low resistivity section. In another particular embodiment the high resistivity section has less than twice the resistivity of the low resistivity section. In another particular embodiment the high resistivity section has more than twice as much resistivity as the low resistivity section. In another particular embodiment, the high resistivity member section has a resistivity that is twice the resistivity of the low resistivity member section. The high resistivity power distribution member section and the low resistivity power distribution member section are electrically connected so that power applied to the low resistivity power distribution member section is transferred to the low resistivity power distribution member section. In another illustrative embodiment, the low resistivity member section is made of copper and the high resistivity member section is made of steel. In another illustrative embodiment, the high resistivity member section is made of stainless steel. In another illustrative embodiment, the high resistivity member section is made of a nickel alloy. In another illustrative embodiment, the high resistivity member section is made of another alloy. In another illustrative embodiment, the high resistivity power distribution member section is made of any material that manifests sufficient resistivity, higher than a resistivity for a low resistivity power distribution member section to perform the functions disclosed herein and operate according to the parent disclosure.

In another illustrative embodiment structures such as cables and buses made of high resistivity materials such as steel, are used to replace structures that are made of low resistivity materials such as copper. The making of a structure in a high resistivity material transforms a low resistivity structure into a high resistivity structure. Thus a particular bus or cable having particular dimensions and made of low resistivity materials such as copper can be manufactured to the same dimensions using a high resistivity such as steel thus enabling replacement of the low resistivity structure with a high resistivity structure. In particular illustrative embodiment the high resistivity structure can be used in place of the low resistivity structure thereby providing a higher resistance structure having the same dimensions in place of the low resistivity structure having the same dimensions. In another embodiment, the low resistivity materials have a higher inductance than the high resistivity materials.

For purposes of illustration, FIG. 1 discloses a power distribution apparatus, which in another embodiment is a bus having a high resistivity section and a low resistivity section. In another embodiment the power distribution member can also be a power distribution cable having a high resistivity section and low resistivity section. In another particular embodiment the power distribution apparatus can be a single section bus or cable having a high resistivity, i.e., substantially twice the resistivity of copper. Resistance and resistivity are used as closely related terms in this disclosure, as a high resistivity material is used to manifest a high resistance and a low resistivity material is used to manifest a low resistance for a cable or bus having the same dimensions. In a particular illustrative embodiment, a particular bus or cable made of copper (low resistivity, thus low resistance) can be replaced by a cable or bus made of steel (high resistivity, high resistance) having the same dimensions but providing twice as much resistance. As shown in FIG. 1, the high resistivity bus section 108 provides power to at least one electrical device. For purposes of illustration the power generators 102 supply alternating current power through the low resistivity bus section to the high resistivity bus section. In another embodiment the low resistivity bus section supplies DC power to the high resistivity bus section.

In another illustrative embodiment, alternating current power generators 102 are connected to the low resistivity bus section 108 though circuit breakers 104. In this example, circuit breakers 104 are relatively large, i.e., rated at 600 volts 2000 amps continuous. In another illustrative embodiment, a feeder (smaller) circuit breaker 105 rated at 800 amps continuous connects a still smaller circuit breaker 107 to a load. Another embodiment is useful for all breaker voltage ratings. The breaker 107 is rated at 100 amps continuous in the present example of FIG. 1. In the example of FIG. 1, the load 114 is powered from a motor control center 110 which contains circuit breaker 107. Power is supplied through the high resistivity power distribution bus member 106 to the feeder breaker 105 and circuit breaker 107. One or more circuit breakers 107 are provided within the motor control center to connect to loads 114. In an illustrative embodiment all of the circuit breakers, including the circuit breakers 107 are also rated for a fault interrupting current. Fault interrupting current is the amount of current that a circuit breaker is able to interrupt during a fault condition such as an electrical short circuit. Fault current ratings may range widely for each of the circuit breakers. Fault current ratings can be specified in kilo amps of interrupting current (KAIC) and can range from 10 KAIC, 25 KAIC, 40 KAIC, 50 KAIC, 65 KAIC, 85 KAIC and 100 KAIC, etc.

As shown in FIG. 1, a short circuit 112 on a power supply line from breaker 107 between circuit breaker 107 and the load 114 causes fault current 109 to flow from the three generators 102 through circuit breakers 104 through the low resistivity section to the high resistivity section 106. The fault current then flows from the high resistivity section 106 through circuit breaker 105 through circuit breaker 107 to the short circuit at 112. The high resistivity section of the bus 106 has a resistivity twice that of the low resistivity section bus 108. The high resistivity of the bus section 106 causes a voltage drop and an associated fault current reduction as the fault current travels through the high resistivity section of the bus 106. Thus, by reducing the voltage through resistive loss, the high resistivity section of the bus reduces the amount of fault current that flows through breaker 107 to the electrical short 112. In an illustrative embodiment, the higher resistivity section 106 enables the specification of a lower fault interrupting current value (KAIC) for breaker 107 than would be required if a low resistivity bus section been used in place of the high resistivity power distribution section. In another illustrative embodiment, the entire power distribution bus is made of high resistivity material such as steel and no lower resistivity material such as copper is used. In another illustrative embodiment the lower resistivity member is a cable.

Figure 2:
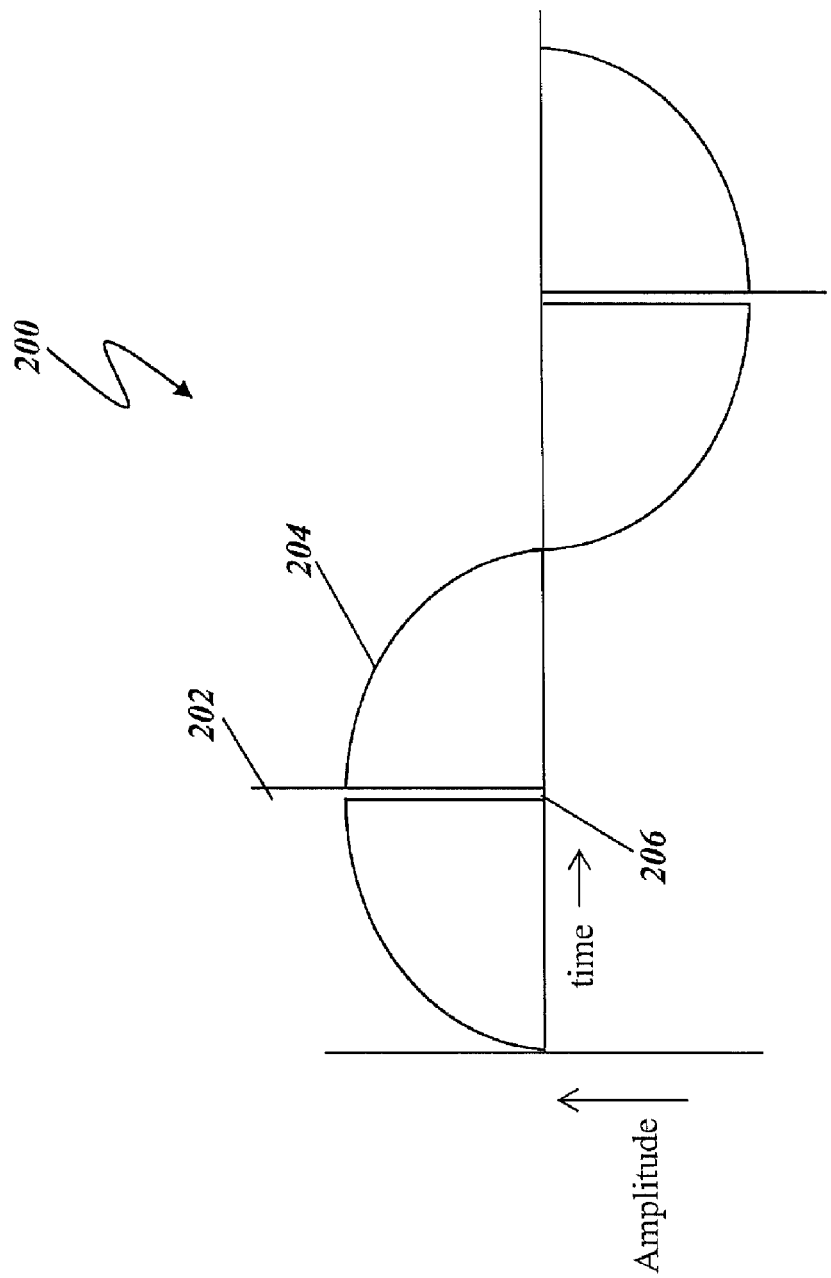
FIG. 2 depicts a voltage notch and voltage spike power disturbance in an alternating current supply voltage.

Turning now to FIG. 2, FIG. 2 is a schematic depiction 200 of commutation voltage spikes 202 and voltage notches 206 are shown superimposed on an alternating current waveform 204. The spikes and notches in the voltage waveform can be caused by the commutation of diode, transistors or silicon controlled rectifiers (SCRs) in a 6-pulse SCR direct current drive with an alternating current 3-phase input.

Figure 3:
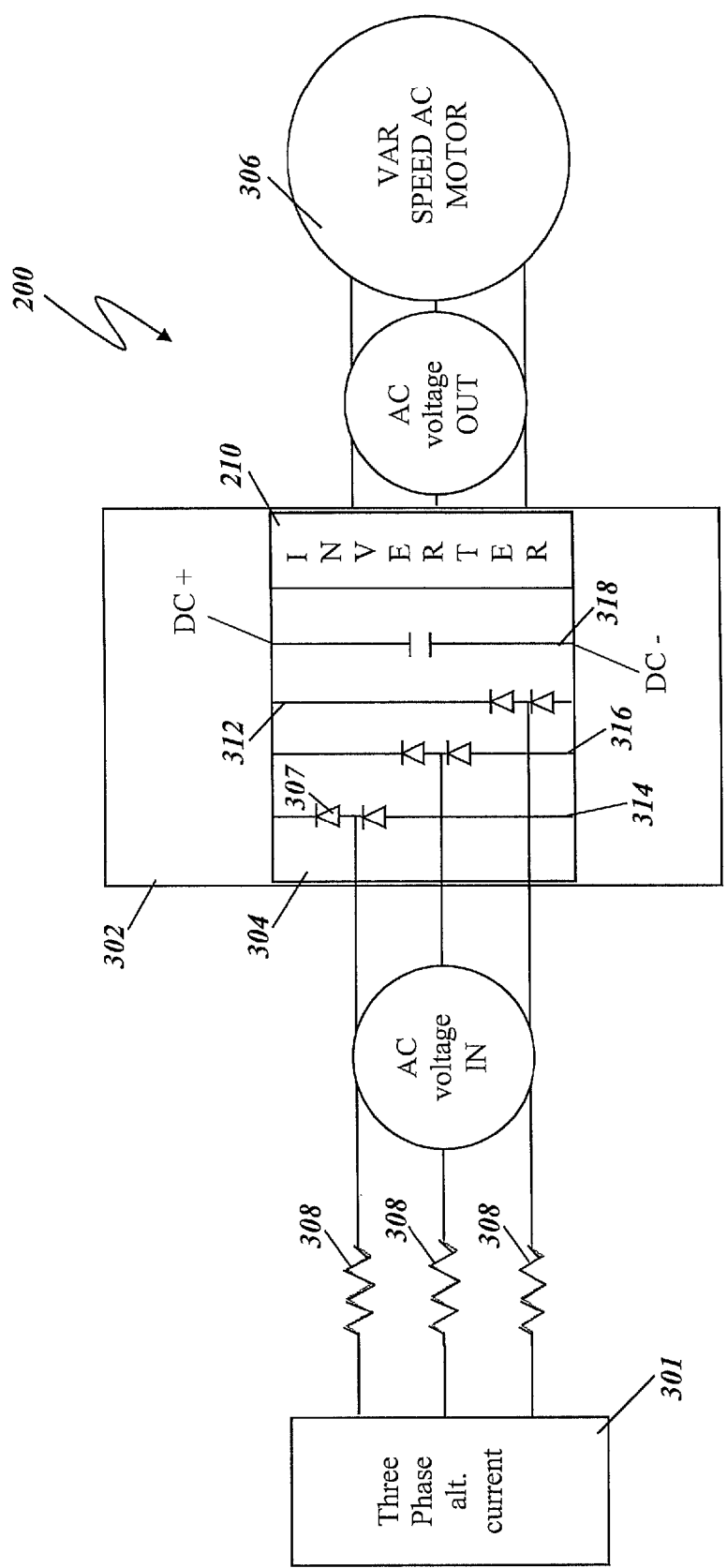
FIG. 3 depicts an illustrative embodiment of a power distribution system using a resistive member to supply power to a voltage source alternating current drive with integral capacitor.

Turning now to FIG. 3, in another illustrative embodiment a plurality of high resistivity power distribution members 308 are provided. In one particular embodiment the high resistivity refers to a resistivity having a resistivity of approximately twice the resistivity of copper. The high resistivity power distribution members 308 are cables having a higher resistivity than copper are provided to supply power to an alternating current variable speed motor drive 302. In another illustrative embodiment, the high resistivity power distribution members are high resistivity buses. Three phase alternating current 301 is provided by the plurality of high resistivity cables 308.

In another illustrative embodiment the high resistivity cables are made of steel. The alternating current drive variable speed motor drive 302 is represented in FIG. 3 in schematic form by silicon controlled rectifiers 307 or other variable speed drives or devices causing harmonic voltage and current disturbance, internal capacitor 318 and an inverter 310. In an illustrative embodiment the high resistivity cables 308 in combination with the internal capacitance 318 of the alternating current drive provides a smoothing RC filter that filters out electrical disturbances on the power distribution system. For example, the resistance of the cable and capacitance of the electrical device receiving the electrical power can be tuned to filter out electrical disturbances on the electrical power above the service frequency of 5-60 HZ, for example, 1000 Hz so that voltage spikes and notches above 1000 Hz such as the voltage notches and voltage spikes at 10 KHz shown in FIG. 3 are filtered out. In another embodiment a frequency lower or higher than 100 HZ is selected for filtering based on the resistance of the cable and capacitance of electrical device. Electrical disturbances can include but are not limited to, voltage spikes and voltage notches on the input of three phase alternating current voltages 301. These spikes and notches can be caused by disturbances such as commutation in a 6-pulse SCR drive. An illustrative embodiment provides a simple high resistivity cable or bus that can be retrofitted into existing power distribution systems or installed new power distribution systems to provide current limiting and electrical disturbance filtering. In another embodiment, high resistivity members 308 provide power to an uninterruptible power supply (UPS) having an internal capacitance. The resistive power distribution apparatus combines with capacitance in the UPS to smooth out voltage notches that cause the UPS to use battery power when sensing the voltage notch as a power outage.

Figure 4:
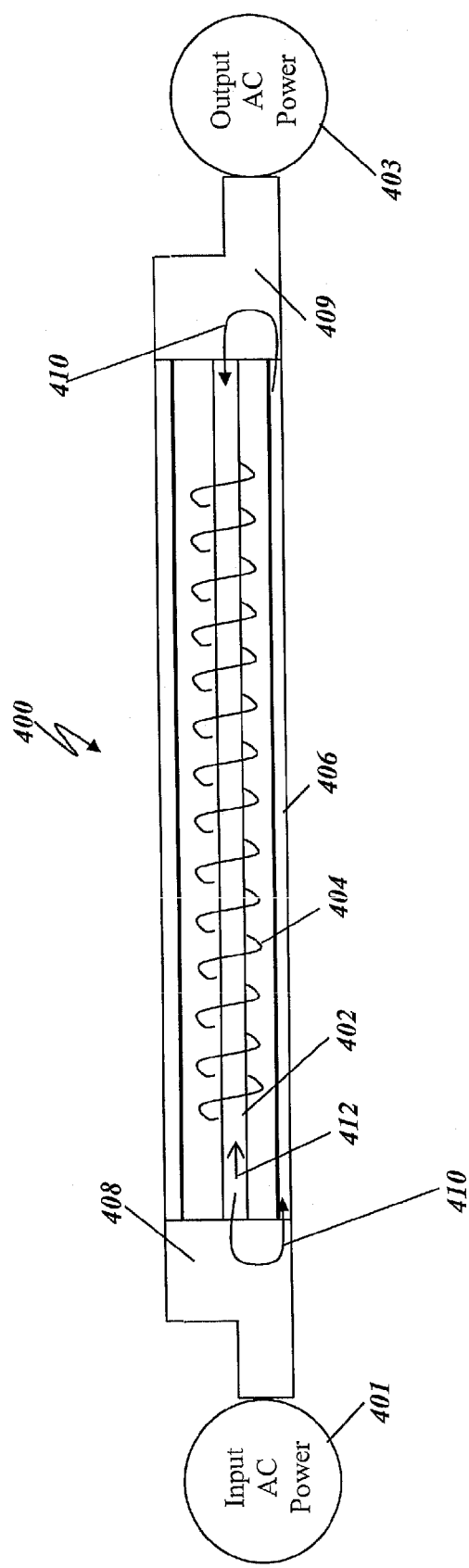
FIG. 4 depicts an illustrative embodiment of a power distribution system using a low resistivity member surrounding a high resistivity center member.

Turning now to FIG. 4 in another illustrative embodiment a power distribution apparatus 400, a cable is provided having a high resistivity center member 402 and a low resistivity outer member 404. The low resistivity outer member surrounds the high resistivity center member. In a particular illustrative embodiment, as shown in FIG. 4, the low resistivity outer member is wound around high resistivity member 402, the low resistivity member forming an inductive coil. In another illustrative embodiment, the high resistivity center member 402 and the lower resistivity member 404 are surrounded by a layer of high resistivity material 406. The high resistivity center member 402, the lower resistivity outer member 404 and the high resistivity outer member 406 are connected electrically at each end by connectors 408 and 409. In another illustrative embodiment, 400 is a bus.

As shown in FIG. 4, high resistivity member 402 provides a current path between connectors 408 and 409. Low resistivity outer member 404 acts like an inductor and presents an inductance to input alternating power 401. High resistivity member 402 acts like a resistance and presents resistance to input alternating power 401. Connectors 408 and 409 at each end of cable 400 electrically connect outer high resistivity member 406 surrounding low resistivity member 404 and center high resistivity member 402. High resistivity outer member 406 and high resistivity center member 402 form a flux path 410 for flux generated by current flowing through low resistivity surrounding member 404. Low resistivity outer member 404 provides a current path 412 for 60 cycle power. High resistivity center member provides a current path for high frequency electrical disturbance currents as discussed below with respect to FIG. 5

The outer low resistivity member 404 of cable or bus 400 looks like an inductor to alternating current input power 401. High resistivity center member 402 looks like a resistor to alternating current input power 401. Capacitance 318 is internal to power consuming electrical devices which consume power supplied through apparatus 400.

At 50-60 Hz inductor 404 presents reactance equal to $j\omega L$, where L=inductance (Henrys) and $\omega=2\pi f$, where f=frequency (Hz). Power distribution systems experience high frequency disturbances superimposed onto the electrical power at a service frequency, 50-60 Hz. In the United States many places in the world, the service frequency is 50 or 60 Hz. In a particular embodiment, the high frequency disturbances are superimposed onto the electrical power at a 50 or 60 Hz service frequency. The electrical disturbances are substantially higher than 60 Hz and range of 10-100 KHz and higher. In another embodiment, the service frequency is another frequency, higher or lower than 60 Hz; however, the service frequency is still substantially lower than the frequency of electrical disturbances.

At 50-60 Hz the inductance presented by low resistivity surrounding member 404 presents a reactance=$j\omega L$ which presents a relatively low resistance path to 60 Hz input current supplied by input power 401. At the higher frequencies for electrical disturbances, however, the inductance presented by low resistivity surrounding member 404 represents a large reactance. Thus, the high frequency current for electrical disturbances is routed largely through resistor 402 and incurs a voltage drop across resistor 402 and an associated drop in current reaching load 508.

Figure 5:
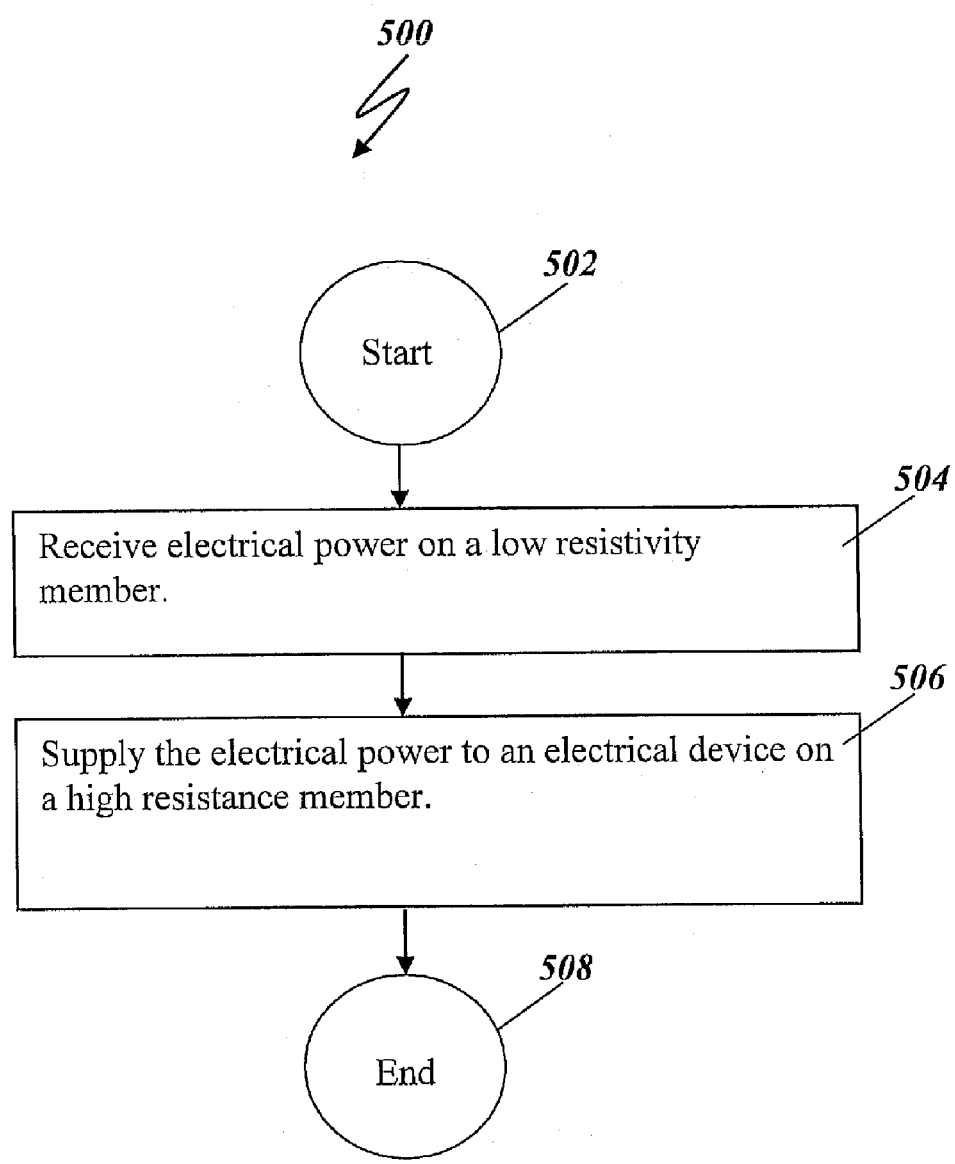
FIG. 5 depicts a flow chart of functions performed in another illustrative embodiment.

Turning now to FIG. 5, a flow chart 500 showing functions performed in another illustrative embodiment is depicted. An illustrative embodiment receives electrical power on a low resistivity power distribution member 504 and delivers the electrical power on a high resistivity power distribution member 506.

Figure 6:
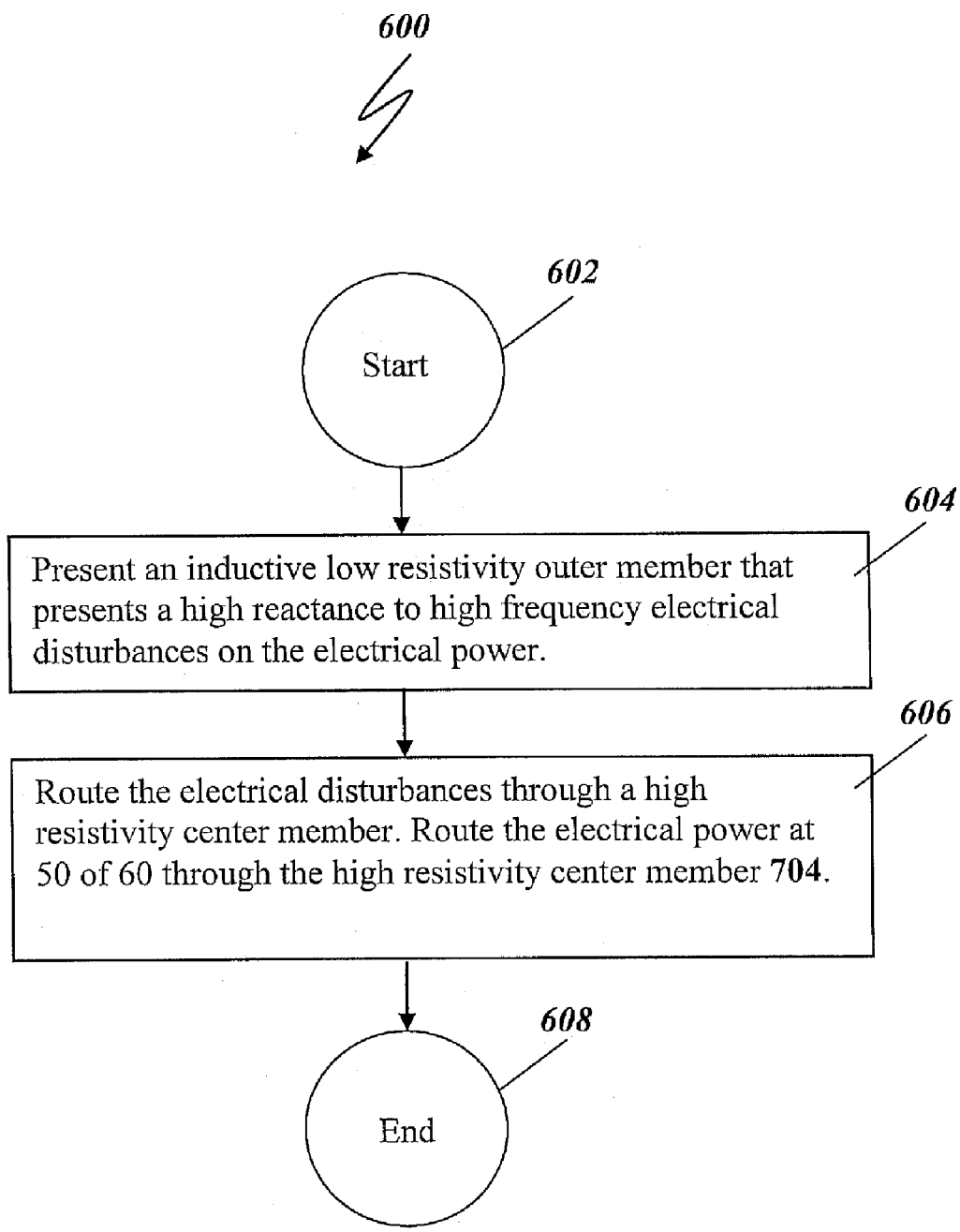
FIG. 6 depicts a flow chart of functions performed in another illustrative embodiment

Turning now to FIG. 6, a flow chart 600 showing functions performed in another illustrative embodiment is depicted. As shown in FIG. 6, another illustrative embodiment at 604 presents an inductive low resistivity outer member that presents a high reactance to high frequency electrical disturbances on the electrical power and routes the electrical disturbances through a high resistivity center member. The electrical power at 50 or 60 Hz is routed through the high resistivity center member 606.

In another illustrative embodiment, the high resistivity member and the low resistivity member can be plated with another material such as tin to reduce corrosion between on the high resistivity member and the low resistivity member. In another illustrative embodiment, the high resistivity member is steel plated with tin and low resistivity member is copper plated with tin.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electrical power distribution apparatus, the apparatus comprising:

a first low resistivity power distribution member section for receiving electrical power from a power supply; and a second high resistivity power distribution member section having a resistivity higher than the first section and electrically connected to the first section for supplying the electrical power to an electrical device, wherein the first power member section provides a first current path for lower frequency currents and a high reactance to higher frequency currents and wherein the second power distribution member provides a second current path for the higher frequency currents.

2. The apparatus of claim 1, wherein the electrical device in electrical communication with the second section, wherein the second section reduces a current to the electrical device.

3. The apparatus of claim 2, wherein the electrical device is an electrical circuit breaker receiving power from the second section during an electrical short circuit on a load side of the electrical circuit breaker.

4. The apparatus of claim 1, wherein the first section has a resistivity of approximately one half of the resistivity of the second section.

5. The apparatus of claim 1, wherein the first section is made of copper and the second section is made of steel.

6. The apparatus of claim 1, wherein the first section and the second section have resistivity approximately equal to twice the resistivity of copper.

7. The apparatus of claim 1, wherein at least one of the first section and the second section is a bus.

8. The apparatus of claim 1, wherein at least one of the first section and the second section is a cable.

9. The apparatus of claim 1, wherein the section forms an electrical filter with a capacitance of the electrical device for smoothing electrical disturbances in the electrical power supplied to the electrical device.

10. The apparatus of claim 9, wherein the electrical device is a device selected from the group consisting of an uninterruptible power supply and an alternating current drive for a variable speed alternating current motor.

11. The apparatus of claim 9, wherein the electrical disturbances are one selected from the group consisting of a voltage spike and a voltage notch.

12. The apparatus of claim 1, wherein the second section comprises a center section and the first section comprises a low resistivity outer member surrounding the center member, wherein the low resistivity member forms an inductor around the center member so that the low resistivity member presents a high reactance to high frequency voltages substantially higher than 50-60Hz, so that the high frequency currents pass through the center member and experience a current reducing voltage loss.

13. The apparatus of claim 12, wherein low frequency electrical power of approximately 50-60Hz sees a low reactance on the low resistivity outer member and travels through the inductor low resistivity outer member.

14. The apparatus of claim 12, wherein the low resistivity outer member has a resistivity of substantially one half the resistivity of the high resistivity center member.

15. The cable of claim 13, wherein the low resistivity outer member is made of copper and the high resistive center member is made of steel.

16. The apparatus of claim 12, further comprising:
an outer high resistivity member surrounding the low resistivity member and the center member.

17. The apparatus of claim 16, further comprising a conductive connector at each end of the cable, wherein the conductive connectors form an electrical connection between the high resistivity center member, the outer low resistivity member and the outer high resistivity member, wherein low frequency current at substantially 60 Hz flows through the outer lower resistivity member and high frequency currents above 1 KHz flow though the high resistivity center member.

18. The apparatus of claim 17, wherein the high resistivity center member and the high resistivity outer member form a magnetic flux path for magnetic flux generated by current flowing in the low frequency surrounding member.

19. An electrical power distribution apparatus comprising a first power distribution: member section for receiving electrical power from a second high resistivity power: distribution member section having a resistivity higher than the first section and electrically connected an electrical device in electrical communication with the second section wherein the first power member section provides a first current path for lower frequency currents and a high reactance to higher frequency currents and wherein the second power distribution member provides a second current path for the higher frequency currents.

20. The apparatus of claim 19, further wherein the second section comprises a center member and the first section comprises a low resistivity outer member surrounding the center member.

* * * * *